US010404791B2

(12) United States Patent
Puri et al.

(10) Patent No.: US 10,404,791 B2
(45) Date of Patent: Sep. 3, 2019

(54) STATE-AWARE LOAD BALANCING OF APPLICATION SERVERS

(71) Applicant: Microsoft Technology Licensing, LLC, Redmond, WA (US)

(72) Inventors: Ranjit Puri, Bothell, WA (US); Benjamin M. Schultz, Bellevue, WA (US); David G. Thaler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 14/960,218

(22) Filed: Dec. 4, 2015

(65) Prior Publication Data

US 2017/0163724 A1    Jun. 8, 2017

(51) Int. Cl.
| G06F 15/173 | (2006.01) |
| G06F 15/16 | (2006.01) |
| H04L 29/08 | (2006.01) |
| H04L 12/26 | (2006.01) |
| G06F 9/50 | (2006.01) |

(52) U.S. Cl.
CPC ........ *H04L 67/1029* (2013.01); *G06F 9/5083* (2013.01); *H04L 43/0805* (2013.01); *H04L 67/2842* (2013.01)

(58) Field of Classification Search
CPC ............. H04L 67/1029; H04L 67/2842; H04L 43/0805
USPC ................. 709/202–203, 213–214, 223–226
See application file for complete search history.

(56) References Cited

U.S. PATENT DOCUMENTS

| 5,774,660 | A | 6/1998 | Brendel et al. |
| 6,665,702 | B1 | 12/2003 | Zisapel et al. |
| 7,567,504 | B2 | 7/2009 | Darling et al. |
| 7,613,110 | B1 | 11/2009 | Blair |
| 7,693,996 | B2 | 4/2010 | Wexler et al. |
| 8,005,926 | B2 | 8/2011 | Harkin et al. |
| 8,248,928 | B1 | 8/2012 | Wang et al. |
| 8,949,410 | B2 | 2/2015 | Patel et al. |
| 2002/0174247 | A1* | 11/2002 | Shen ................... H04L 67/2842 709/238 |
| 2004/0244007 | A1 | 12/2004 | Garza et al. |
| 2005/0015621 | A1* | 1/2005 | Ashley ................ H04L 63/0227 709/226 |
| 2005/0060360 | A1* | 3/2005 | Doyle ................. H04L 41/5054 709/200 |
| 2005/0091396 | A1 | 4/2005 | Nilakantan et al. |
| 2005/0102393 | A1 | 5/2005 | Murray et al. |

(Continued)

OTHER PUBLICATIONS

"Second Written Opinion Issued in PCT Application No. PCT/US2016/063734", dated Jul. 25, 2017, 4 Pages.

(Continued)

*Primary Examiner* — Bharat Barot
(74) *Attorney, Agent, or Firm* — Workman Nydegger

(57) ABSTRACT

A load balancer receives a client request from a client device for a connection to an application. The load balancer queries a monitoring server for a list of one or more application servers associated with the application. The monitoring server determines, based on cache state information of the plurality of application servers, the list of one or more application servers. The load balancer establishes a connection on behalf of the client device to one of the application servers.

20 Claims, 5 Drawing Sheets

(56) References Cited

U.S. PATENT DOCUMENTS

| | | | |
|---|---|---|---|
| 2005/0144317 A1 | 6/2005 | Chase et al. | |
| 2006/0212532 A1* | 9/2006 | Burckart | H04L 67/148 709/217 |
| 2008/0163064 A1 | 7/2008 | Swildens et al. | |
| 2011/0238733 A1 | 9/2011 | Yoo et al. | |
| 2012/0278663 A1* | 11/2012 | Hasegawa | G06F 11/0709 714/47.1 |
| 2014/0136668 A1* | 5/2014 | Brunswig | G06F 9/5072 709/222 |
| 2014/0149794 A1* | 5/2014 | Shetty | H04L 67/1095 709/213 |
| 2014/0289311 A1* | 9/2014 | Kubota | H04L 67/1036 709/203 |
| 2016/0210208 A1* | 7/2016 | Chen | G06F 11/1484 |
| 2017/0161650 A1* | 6/2017 | McGuire | G06Q 10/02 |

OTHER PUBLICATIONS

Casalicchio, et al., "Content-aware Dispatching Algorithms for Cluster-Based Web Servers", In Journal Cluster Computing, vol. 5, Issue 1, Jan. 1, 2002, pp. 65-74.

Dominguez-Sal, et al., "Cache-aware Load Balancing vs. Cooperative Caching for Distributed Search Engines", In Proceedings of the 11th IEEE International Conference on High Performance Computing and Communications, Jun. 25, 2009, pp. 415-423.

Elmeleegy, et al., "Adaptive Cache-Driven Request Distribution in Clustered EJB Systems", In Proceedings of the Tenth International Conference Parallel and Distributed Systems, Jul. 1, 9, 2004, 8 Pages.

"International Search Report and Written Opinion Issued in PCT Application No. PCT/US2016/063734", dated Mar. 1, 2017, 11 Pages.

Chertov, et al., "Optimistic Load Balancing in a Distributed Virtual Environment", In Proceedings of 16th International Workshop on Network and Operating System Support for Digital Audio and Video, Nov. 22, 2006, 6 pages.

Bitar, et al., "Interface to the Routing System (I2RS) for Service Chaining: Use Cases and Requirements", Published on: Jul. 15, 2013 Available at: https://tools.ietf.org/html/draft-bitar-i2rs-service-chaining-00, 25 pgs.

Thaler, et al., "Multipath Issues in Unicast and Multicast Next-Hop Selection", Available at <http://tools.ietf.org/html/rfc2991>, The Internet Society, Nov. 2000, pp. 1-9.

Thaler, et al., "Using Name-Based Mappings to Increase Hit Rates", IEEE/ACM Transactions on Networking, vol. 6, No. 1, Feb. 1998, pp. 1-14.

"International Preliminary Report on Patentability cited in Application No. PCT/US2016/063734," dated Sep. 11, 2017 (Copy Attached).

\* cited by examiner

STATE-AWARE LOAD BALANCING OF APPLICATION SERVERS

BACKGROUND

A conventional load balancer includes a proxy server that facilitates application flows between a client device and an application server. The load balancer distributes traffic amongst a plurality of application servers, which may be virtualized instances of the application server running on multiple hosts. The load balancing mechanism might be a round-robin distribution scheme, or some other mechanism to distribute the application flows to the servers. The proxy server represents the application servers to an outside client. The proxy server provides service continuity. The load balancer or the proxy server component may monitor whether the application servers are accessible, and distribute the incoming flows to those application servers that are currently accessible.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Examples of the present disclosure provide systems, methods, and apparatuses for load balancing in which a monitoring service monitors state information of a plurality of applications servers. State information includes such things as hardware-based state information, software state information, status of network connectivity of the application servers to back-end servers, or other state information. When the load balancer receives a request from a client device to establish a new flow to the application server, it queries the monitoring server for the identifier usable to identify an application server to handle the request. The monitoring server receives the query and provides one or more application server identifiers back to the load balancer based on the state information of the application server. The load balancer selects one of those identifiers and sets up a connection, such as a proxy connection, to the application server.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Embodiments of the present application include an environment with load balancing and in which a monitoring service monitors state information of a plurality of applications servers. State information includes such things as hardware-based state information, including CPU utilization, network utilization, and memory load on the host servers that host the application server instances. The state information also may include software state information such as the number of flows being handled by the host server or a particular application server instance, the cache state of the application servers, and so forth. The state information may include the status of network connectivity of the application servers to back-end servers. When the load balancer receives a request from a client device to establish a new flow to the application server, it queries the monitoring server for the identifier of an application server to handle the request. The monitoring server receives the query and provides one or more application server identifiers back to the load balancer based on the state information of the application server. The load balancer selects one of those identifiers and sets up a connection, such as a proxy connection, to the application server.

A conventional load balancer may maintain "up or down" state information for the application servers that it serves. However, a conventional load balancer has no further visibility into each application server. For example, a conventional load balancer does not have visibility into the CPU load of the application server, the application server data cache, or other information regarding the appropriateness of particular application servers to a client request. This information is useful in optimizing or otherwise improving datacenter resource utilization to provide applications to many more client devices. Embodiments of the present disclosure utilize state information. This state information indicates current application servers' capacity and responsiveness, as well as how this capacity and responsiveness is impacted by the datacenter's infrastructure (e.g. the operating systems, software, servers, storage, and network equipment). The monitoring server may also receive information indicating the states of application servers that are instantiated as virtual machines. The monitoring server may be configured to maintain information on the data that is cached in the application servers, which may provide information regarding which application server is most suitable or otherwise sufficiently suitable for responding to a client request.

Embodiments of the present application therefore provide the ability to route connection requests intelligently amongst application servers in a load-balanced, data center environment. Compared with conventional load balancing, embodiments provide faster responses to client requests, fewer dropped connections, fewer timeouts, and so forth.

Figure 1:
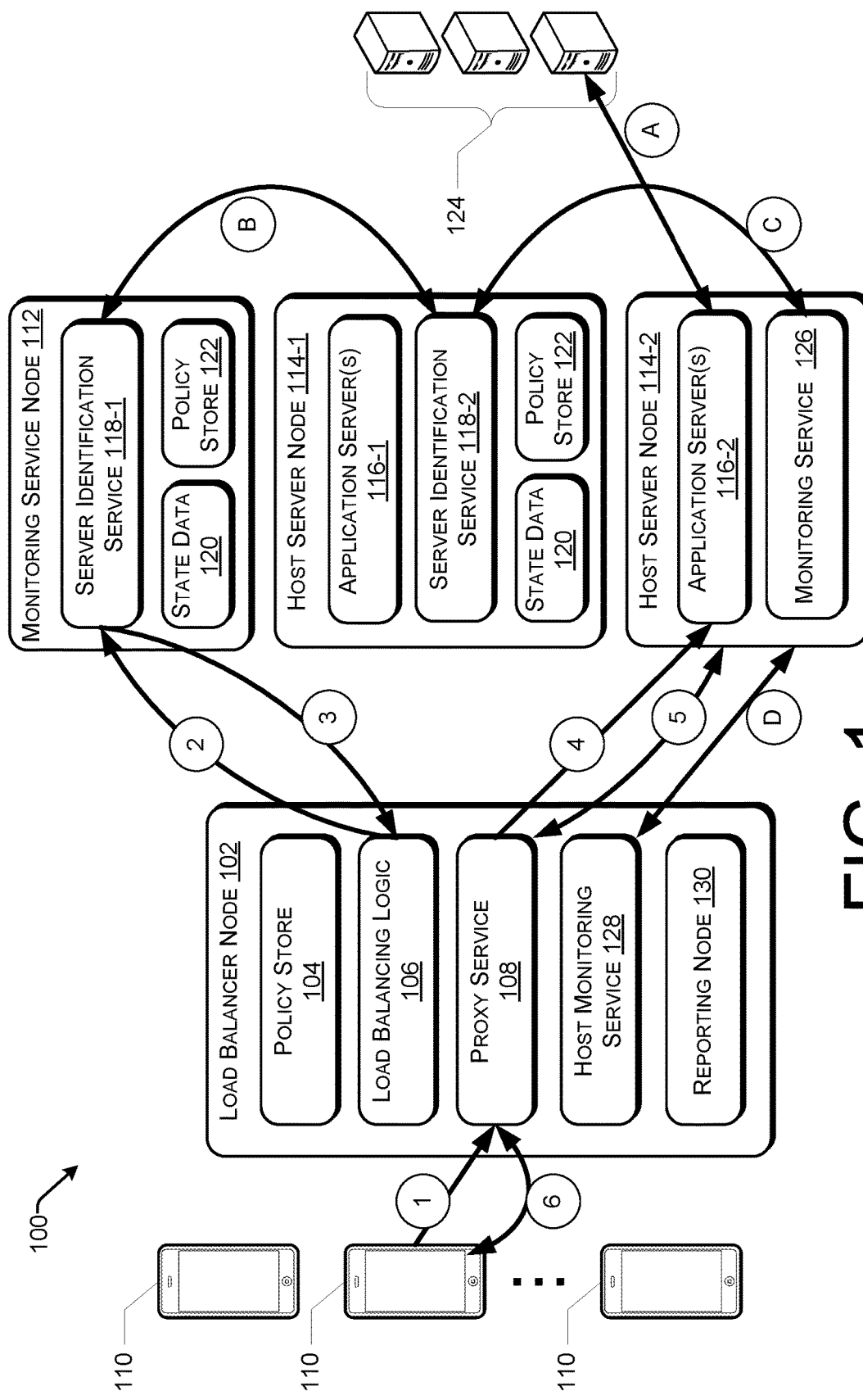
FIG. 1 is a block diagram that illustrates an example environment for state-aware load balancing.

FIG. 1 is a schematic diagram that illustrates an example environment 100 for state-aware load balancing. A load balancer node 102 includes a policy store 104 and load balancing logic 106. The load balancer node 102 may include a server computer on which the components of the load balancer node 102 are stored and executed. The load balancer node 102 may also include router functionality, firewall functionality, network address translation (NAT) functionality, and so forth. The load balancer node 102 may be a dedicated hardware load balancer, or a server computer implementation of a load balancer, including a virtualized instantiation of a load balancer executing on a data center computing system. Aspects of the load balancer node 102 may be distributed amongst one or more computing systems.

A proxy service 108 of the load balancer node 102 proxies connections for one or more client devices 110. A monitoring service node 112 monitors a plurality of host server nodes 114, which host one or more application servers 116. The application servers 116 may be virtualized instantiations that execute as virtual machines, as application containers, or as other virtualization types.

The application servers 116 may include front-end servers, such as web-servers, email servers, or other servers to which the client devices 110 may initially connect. The application servers 116 may include middle tier servers, such as may apply "business logic" in a networked environment. Such business logic, for example, may include stateful data associated with client sessions fronted by a front-end server, such as a web server or other server. One example is a shopping cart server that handles the stateful data associated with a customer's shopping cart during a shopping session on an e-commerce website. Another example may be a server that provides cloud-based productivity software (e.g., spreadsheet programs, word processing programs, and so forth) via a web interface to the client. The application servers 116 may also include back-end servers, such as database servers, which may provide information that middle-tier servers or front-end servers utilize to obtain data relevant to a session established with a client device 110. Other examples of application servers 116 are possible without departing from the scope of embodiments.

Although the client devices 110 in FIG. 1 are shown to be handheld computing devices (such as for example tablet computers or mobile phones), the client devices 110 according to embodiments includes a wide range of devices capable of establishing a client-server connection with application severs 116, including laptop computers, gaming consoles, desktop computers, smart televisions, television set-top boxes, server computers, kiosk computing system, media players, smart appliances (such as network-enabled thermostats, home security systems, refrigerators, and so forth), wearable devices (such as computing devices embedded in clothing, in glasses, goggles, shoes, and so forth). The client devices 110 also include application servers, including multi-user, multi-application servers. In one implementation, the client devices 110 may be front-end web servers, and the application servers 116 may be middle layer servers that provide business logic services to the client devices 110. Thus, the client devices 110 may be themselves server computers that connect with other client devices to provide application functionality to those client devices. Other examples of client devices 110 are possible without departing from the scope of embodiments.

The proxy service 108 accepts incoming client requests from one or more client devices 110 for connections to an application, indicated in FIG. 1 with a circled "1." The application is associated with the application servers 116, which are configured to service client requests associated with the application. The client request identifies the application. For example, the application may be identified by one or more of a destination network address, a protocol, a destination port number, higher layer information, and so forth. In an Internet Protocol (IP) networking environment, the application may be identified by a destination IP address, an indication of a transport layer protocol (such as Transport Control Protocol (TCP), User Datagram Protocol (UDP), and a port number. In one example, the port number may be a TCP port number, such as the "well-known" TCP port number 80, which indicates that the request is a Hypertext Transfer Protocol (HTTP) request. In this example, the client request may include an HTTP request to establish an HTTP connection to a web server. But other TCP or UDP ports may be used to identify the application without departing from the scope of embodiments. In addition, an application may be defined as based on some other protocol, such as HTTP, Real Time Protocol (RTP), and so forth. Other protocol suites, besides IP networking, may also be used without departing from the scope of embodiments. The client request may also include other information specific to the request, such as a request for a specific file or data to be provided, and so forth.

The destination IP address included in the client request may be a public IP address, which resolves from a domain name service (DNS) request for a uniform resource locator (URL) associated with the application. The load balancer node 102 is assigned the public IP address, on an external- or public-facing port of the load balancer node 102. The proxy service 108 receives the request, and communicates with the application servers 116 to establish a connection on behalf of the client device 110, as described in more detail below. The proxy service 108 and the application servers 116 may be assigned IP addresses from a private address space within the environment 100.

The load balancing logic 106 determines a server identification service 118 to associate with the request from the client device 110. Where a server identification service 118 resides on a host server node 114 (such as the server identification service 118-2), the load balancing logic may select a host server node 114 that is active and reachable via underlying network devices of the infrastructure of the data center. The load balancing logic 106 may select from amongst one or more default server identification services 118, such as based on one or more of a priority list contained in the policy store 104, using a round-robin scheme, a random selection, and so forth.

The load balancing logic 106 transmits to the monitoring service node 112 a query related to the request. An example query is a query for a list of one or more application servers 116 to handle the request. This is shown in FIG. 1 with a circled "2." A packet exchange, using for example TCP or UDP may be used to communicate between the load balancer node 102 and the monitoring server node 112. The query may include information from or regarding the client request. For example, the entire client request may be forwarded by the load balancing logic to the monitoring service node 112. Alternatively, a subset of information from the request may be provided in the query. The subset of information may include the destination network address (e.g., the destination IP address), the source network address of the client device 110 (e.g., the source IP address of the client device 110), information identifying the destination protocol (e.g., TCP, UDP, or some other protocol), information identifying a destination port (e.g., TCP port 80, or some other official or unofficial TCP or UDP port), a source port identified in the request (e.g., a source TCP or UDP port). The query may also include other information included in the client request, including higher protocol layer information, such as data indicating a request for a particular information, file, and so forth.

A server identification service 118 in the monitoring service node 112 is passed the query received by the monitoring service node 112. The server identification service 118 parses the data included in the query, including the data regarding the client request. The server identification service 118 utilizes state data 120, as well as policies in a policy store 122, to determine a list of one or more of the application servers 116 to handle the client request.

The state data 120 may include hardware state data of the host server nodes 114, including one or more of CPU utilization data of the host server nodes 114, memory utilization data of the host server nodes 114, and network utilization data of the host server nodes. The CPU utilization data may include instructions per second, a percentage of a maximum CPU utilization achieved over a time period, or some other CPU utilization data. The memory utilization data may include a percentage or amount of system memory (such as random access memory) that is currently utilized, a percentage or amount of permanent storage (such as a hard disk drive or solid state drive) that is currently utilized, memory bus or port transmit utilization data, and so forth. The network utilization data may include a number of data packets over a period of time (e.g., packets per second), percent or amount of bandwidth or data rate utilized (e.g., bits per second), an average or peak amount of data present in transmit or receive queues during a time period, or other data related to network interfaces. Hardware state data may also include other information, such as power consumption data, temperature data, and other data, which may indicate how busy the host server nodes 114 are at a given time.

The state data 120 may include software state data, such as one or more of virtual machine states of the application servers 116, connections (or "flows") per second being handled by the host server nodes 114 and/or the application servers 116, a cache state of the application servers 116, numbers of cache misses and/or cache hits, the status of network connectivity of the application servers 116 to back-end servers 124, and so forth. The cache state information may include information about the data cached on the application servers 116. The application servers 116 may, for example, respond to a client request by obtaining data from back-end servers 124 (an exchange illustrated in FIG. 1 with a circled "A"), from other servers (such as servers located within the environment 100, or from servers on the Public Internet, as well as other locations). The application servers 116 may generate data during execution of their functions, and cache that data in a memory. Such cached data that is generated or retrieved for a first client may also be relevant to another client request, and knowledge of the cached data may assist in identifying an application server 116 to service the new client request. Overlapping cache state data may indicate a suitable application server 116 to handle the new client request. There may be integer N relevant data portions for a new client request. The cache state data may indicate that application servers 116 have X of N relevant portions. The application servers with the highest value of X may be selected to service the request.

The policy store 122 may include configurable or non-configurable policies that the server identification service 118 utilizes to determine a list of one or more of the application servers 116 to handle the client request. The policies in the policy store 122 may include certain thresholds, such as hardware utilization thresholds or software utilization thresholds that disqualify an application server 116 from handling a request. For example, a CPU utilization exceeding 60% may be a configurable threshold that disqualifies any application servers 116 that execute on a host server node 114 meeting or exceeding that threshold from servicing the client request. A network utilization threshold of 80% may likewise be a configurable threshold that disqualifies any application servers 116 executing on a host server node 114 that meets or exceeds that threshold. The policies in the policy store 122 may also include configurable options for sending certain requests to certain application servers 116. For example, certain application servers 116 may be associated by the policy store 122 with different source IP addresses, destination IP addresses, protocols, source ports, destination ports, and so forth. Part of the selection process for an incoming data query may be based on selecting from amongst application servers 116 that are associated with the addresses, protocols, and ports in the client request.

The policies in the policy store 122 may include one or more algorithms that are utilized to determine a list of the application servers 116 to handle the client request. An algorithm may include a weighted sum, into which various factors are input to create a priority metric for an application server 116. An example weighted sum algorithm may be:

$$\text{Priority} = A \times \text{CPU\_util} + B \times \text{Network\_util} + C \times \text{Cache\_state} \qquad \text{Eq. 1}$$

A, B, and C may be configurable or non-configurable weights specified in the policy store 122. CPU_util may be a metric associated with the CPU utilization of a host server node 114. Network_util may be a metric associated with the network interface utilization of the host server node 114. Cache_state may be a metric associated with the relevance of the data stored on the host server node 114. Cache_state may represent a likelihood that data stored in the cache is relevant to the client request. Cache_state may be a first value if the cache has relevant data and a second value if the cache does not have the relevant data. Cache_state may indicate an amount or percentage of the requested data stored on the cache, and so forth. Other example weighted sum algorithms, and other types of algorithms may be utilized without departing from the scope of embodiments.

The policies in the policy store 122 may also configure the server identification service 118 to determine trend data. The server identification service 118 may determine from historical data, a current trend in order to predict future capacities on one or more of the host server nodes 114 and/or the application servers 114. Where trend data indicates that a host server node 114 and/or an application server 114 may soon exceed one or more threshold capacity levels, the server identification service 118 may cause another application server 114 to be instantiated, such as on another server node 114. The server identification service 118 may determine one or more application servers 114 to handle a client request based on such health monitoring and trend data. For example, an application server 114 hosted on a host server node that is close to a threshold capacity metric, may be selected to handle a client request if its trend is downward, but may not be selected if it's trend is upward. Other examples are possible without departing from the scope of embodiments.

The server identification service 118 may select up to a certain number of application servers 116 that meet a threshold priority metric (which may also be a configurable or non-configurable element of the policies in the policy store 122). The server identification service 118 may select a certain number of the application servers 116 having the highest priorities, and so forth. The server identification service 118 determines one or more identifiers of the application servers 116. The identifiers may include IP addresses, a server name, or some other identifier. The identifiers may be a hash value that uniquely identifies the application servers 116. In some embodiments, Highest Random Weight (HRW) may be used to provide hash values for a list of the application servers 116. The load balancer node 102 may utilize the HRW hash values to select the application servers to handle the client request. To utilize the HRW hash values, the load balancer node 102 may select the application server having the highest or largest HRW hash value. Utilized across many load-balancing instances, since hash values are pseudo-random, the application server having the highest hash value will be a pseudo-randomly selected application server, resulting over a large number of instances in even distribution of the application servers. The HRW hash values may be different than any hash values used to identify the application servers. In other words, the HRW hash values may be used to select from amongst the application servers, but another identifier (including a hash value) may be used to identify the servers.

The server identification service 118 may determine one or more application servers 116 to handle the client request based on the state data 120, such as based on calculated priority metrics. In the event that all host servers 114 and/or application servers 116 are currently experiencing heavy load, such as all above a certain threshold metric indicating load, the server identification service 118 may cause another application server 116 to be instantiated on a new host server node 114. In that case the server identification service 118 may determine an identifier regarding the newly instantiated application server 116 to be passed to the load balancing logic.

The server identification service 118 causes the list of identifiers of one or more application servers 116 to be transmitted to the load balancer node 102. This is identified in FIG. 1 with a circled "3." The load balancer node 102 passes the list to the load balancing logic 106. The load balancing logic 106 selects an application server from the one or more application servers 116 indicated in the list provided by the server identification service 118. The selection may be based on configuration, such as are provided by one or more policies in the policy store 104. The policy in the policy store 104 may provide that a random one of the application servers 116 be selected. The policy in the policy store 104 may provide that one of the application servers 116 having the highest priority metric be selected. Thus, in some embodiments, the server identification service may provide a priority metric along with or in addition to the list of one or more application servers 116 to handle the client request. In some embodiments, the identifiers are used to select the application server 116 to handle the client request. For example, where the identifiers are associated with HRW hash values, the application server associated with a smallest or largest hash value may be selected. The load balancing logic 106 may also utilize up/down information regarding the application servers 116, such as based on monitoring of the network accessibility of the application servers by the load balancer node 102, as described in more detail below. The policies in the policy store 104 may provide that any application servers 116 that are inaccessible—such as due to a transient network issue or for other reason—are not selected from the list of one or more application servers 116 to service the client request. In that case, a highest priority server that is available may be selected.

The load balancing logic 106 provides the proxy service 108 with an identification of the selected application server 116, such as a network address or other identifier of the selected application server 116. The proxy service 108 transmits a request to the host server node 114 that hosts the selected application server 116. This is shown in FIG. 1 with a circled "4." The host server node 114 passes the request to the application server 116, which then replies to the request from the proxy service 108, according to its normal operation, and a connection is established between the application server 116 and the proxy service 108 to handle the client request. This connection is shown in FIG. 1 with a circled "5." The proxy service 108 establishes a connection with the client device 110, shown in FIG. 1 with a circled "6," and the requested data is transmitted to the client device 110 from the application server 116 via the proxy service 108 and the two connections, in a manner similar to or the same as a conventional proxy connection. The proxy service 108 makes it appear as if the client device 110 is connected to the application server 116 by establishing connections with both the application server 116 and the client device 110.

As noted above, the server identification service 118 utilizes state data 120 of the host server nodes 114 and the application servers 116 to determine a list of one or more application servers 116 to handle the client request. The server identification service 118 may obtain this state data in several ways. In some embodiments, the server identification service 118 receives push notifications from the host server nodes 114, such as via a monitoring service 126 on the host server node 114-2 or another instance of the server identification service 118-2 stored on one of the host server nodes 114. (In the example illustrated in FIG. 1, the server identification service 118 is present on the host server node 114-1). These exchanges are illustrated in FIG. 1 with circled labels "B" and "C." Multiple instances of the server identification service 118—such as the server identification service 118-1 and 118-2—may exchange their state data 120 so that both instances have a complete data set, and can respond to queries from load balancer node 102 to provide lists of one or more application servers to handle client requests. The monitoring service 126 may be an operating system component, a separate component of the host server node 114-2, a component of a hypervisor installed on the host server node 114-2, and so forth.

The server identification service 118 may monitor network traffic of the host server nodes 114, including for example the network traffic to and from the back-end servers 124, or other network nodes, to determine some or all of the state data 120. For example, the monitoring service node 121 may include a network data monitor (e.g., a "packet sniffer") that monitors network traffic to determine files or other data obtained by the application servers 116 from the back-end servers 124, or from other locations. The network traffic may also provide information regarding network traffic loads, such as packets-per-second, bits-per-second, and so forth, even if such data on the network is wholly or partially encrypted. Also, the network traffic data stored in the state data 120 may be obtained by the server identification service 118 from monitoring or reporting agents present on network elements in the network, such as on routers, switches, power racks, uninterruptable power supplies (UPS), dedicated monitoring devices, and so forth.

A host monitoring service 128 of the load balancer node 102 may also monitor the application servers. This is shown in FIG. 1 with a circled "D." The host monitoring service 128 may monitor traffic to the host server nodes 114 to determine whether the host server nodes 114 remain accessible via the underlying network. The host monitoring service 128 may also request and receive data from the host server nodes 114 and/or the application servers 116 regarding their load. Thus, in some embodiments, the load balancer node 102 may obtain and store some or all state data (similar to or the same as state data 120). The host monitoring service 128 may maintain availability information indicating whether the host server nodes 114 and/or the application servers 116 are available and/or reachable on the network via underlying network devices of the infrastructure of the data center. The host monitoring service 128 may send various keep-alive messages, pings, requests, or other data transmission types to the host server nodes 114 and/or the application servers 116 to determine whether they are accessible via the network. The host monitoring service 128 may include virtualized switching or routing functionality, and thus may have routing or switching data associated with the underlying data center network (such as routing table updates), and thus be able to identify transient or non-transient network changes or failures that impact the accessibility of the host server nodes 114. The load balancing logic 106, as discussed above, may select an application server 116 from amongst the list of one or more application servers 116 provided by the monitoring service node 112 based at least in part on the availability information. The load balancing logic 106 may also select one or more of the application servers based, at least in part, on state data. Thus, the load balancing logic 106 may receive a list of application servers 116 from the server identification service 118, and order that list of application servers 116 based on its own state and/or availability information. In some embodiments, the server identification service 118 provides a list of application servers 116 to the load balancing logic 106 based at least in part, on state data 120 (and policy store 122), and this list of application servers 116 may also indicate or be accompanied by information indicating a priority, ranking, or weighting of the list of application servers 116. The priority, ranking, or weighting of the application servers 116 may itself be based on the state data 120 and/or the policy store 122. In addition, the load balancing logic 106 may separate determine a priority, ranking, or weighting of the list of application servers 116 based on state data and availability data separately determined and obtained by the host monitoring service 128.

The load balancer node 102 also includes a reporting node 130. The reporting node 130 is configured to relay data to a management node. The data relayed to a management node includes such things as load data and availability (both current and historical) reported by each application server 114 and obtained and stored by the host monitoring service 128. The data may include statistics regarding incoming traffic from the client devices 110. An application administrator may use this data to refine the load balancer policies (e.g., the policies stored on the policy store 104) and/or the monitoring service 112 policies (e.g., the policies stored in the policy store 122). The administrator may also utilize this reported data to alter the algorithms used to determine load and/or the algorithms to select the application servers 116 to handle client requests.

In one example, the reporting node 130 may report data indicating that an application server 116 is overloaded. Based on a configurable policy (e.g., a policy in the policy store 104) the management node may utilize data reported by the reporting node 130 to automatically cause instantiation of additional application servers 116 within the datacenter. This enables the automatic regulation of consumption of data center resources in direct response to the current load experienced by an application (e.g., the load experienced collectively by all application servers 116 associated with a single application) thereby increasing the cost efficiency for an application.

Where an overload threshold for a particular application server 116 is nearing capacity, a management node (or an administrator) may check the data reported by the reporting node 130 to determine if an application server 116 is at a stress level. The policies in the policy store 104 may be modified to increase the capacity threshold levels for application servers 116 that are not at stress levels. This results in adding additional incoming data connections to those particular application servers. The data can be further evaluated by the management node, and if the stress level is not exceeded at the greater capacity threshold levels, a further increase in the overload threshold may be implemented. Likewise, application servers 116 that experience stress levels at capacity levels below their thresholds may be identified, and their capacity level thresholds reduced in the policy store 104.

Although FIG. 1 is illustrated as having a stand-alone monitoring service node 112, the server identification service 118 may reside on one of the host server nodes 114, such as a virtualized instantiation executing in an application container, hypervisor, or the like. In some embodiments not illustrated in FIG. 1, the server identification service 118 resides as a module on the load balancer node 102. The load balancer node 102 and/or the monitoring service node 112 may reside on one or more physical server machines, and/or may be virtualized instantiations that reside on the same or different physical servers. In an implementation, there may be more than one load balancer nodes 102 deployed in the environment 100.

Although FIG. 1 is illustrated as having a single proxy connection established between the load balancer node 102 and one of the application servers 116, the load balancer node 102 in practice proxies multiple connections with multiple client devices 110 to multiple application servers 116. More than one proxy connection for a particular client device 110 may be load-balanced by the load balancer node 102, such as to one or more application servers 116.

An administrator may provide policies that determine how one or both of the monitoring service node 112 and the load balancer node 102 operate, including load-based thresholds (CPU utilization thresholds, memory utilization thresholds, network utilization thresholds, connection thresholds, thresholds numbers of connections per second, and so forth). Various aspects of the algorithms utilized by the server identification service 118 and/or the load balancing logic 106 may also be configurable, such as to control how the load balancing logic 106 selects from amongst the application servers 116 identified by the monitoring service node 112; this may include configurable weights, the identification of state data 120 to include in determining the list of application servers 116, and so forth. Also configurable via policy may be whether the load balancing logic 106 may override the selection of priorities determined by the server identification service 118, such as based on its own monitoring of the application servers 116 and/or host server nodes 114, or other information that may be available to load balancing logic 106.

Figure 2:
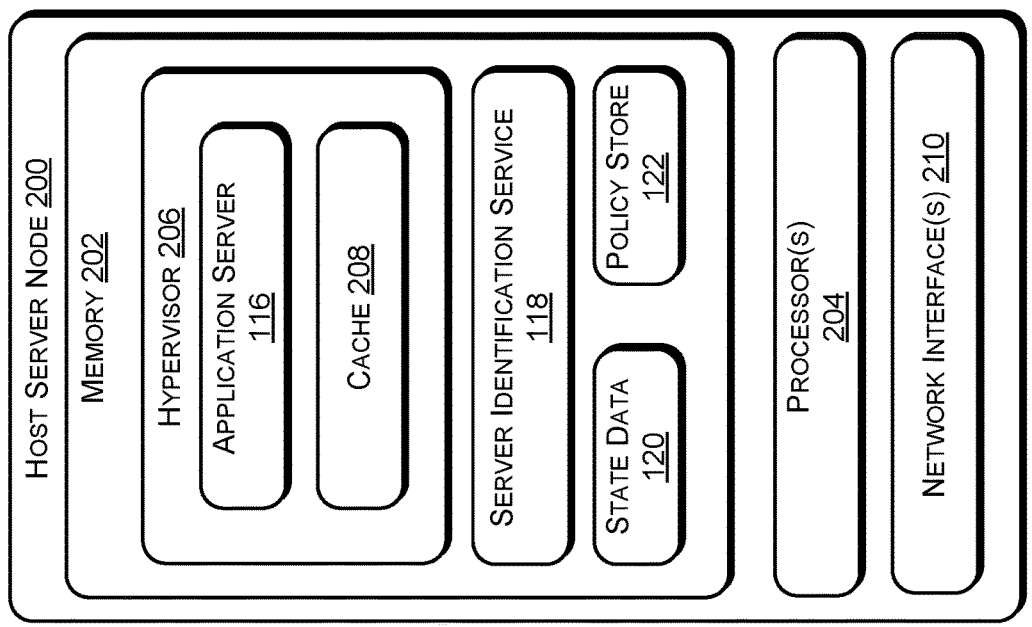
FIG. 2 illustrates a block diagram of an example host server node having a server identification service.

FIG. 2 illustrates a block diagram of a host server node 200 having a server identification service 118. The host server node 200 may be the same as or similar to the host server node 114-1 of FIG. 1. The host server node 200 includes a memory 202 and one or more processors 204. The memory 202 is a system memory, such as RAM, as is described in more detail elsewhere within this Detailed Description. The memory 202 includes a hypervisor 206, in which one or more application servers 116 execute as virtualized instantiations. A cache 208, temporarily stores data associated with the application server 116, such as files or other data that may be obtained or generated responsive to client requests.

The server identification service 118 maintains state data 120 and utilizes a policy store 122, as described elsewhere within this Detailed Description. The server identification service 118 monitors the state of application server 116, as well as the host server node 200, and other application servers executing on other host server nodes in the network. The server identification service 118 may also provide state data 120 to, and/or receive state data 120 from, other server identification services 118 in the network or from a monitoring service, such as the monitoring service 126.

The host server node 200 includes one or more network interfaces 210, which connect the host server node 200 to the network, enabling the host server node 200 to communicate with other devices on the network, such as the monitoring service node 112 and/or the load balancer node 102.

Other examples of host server nodes 200 are possible without departing from the scope of embodiments.

Figure 3:
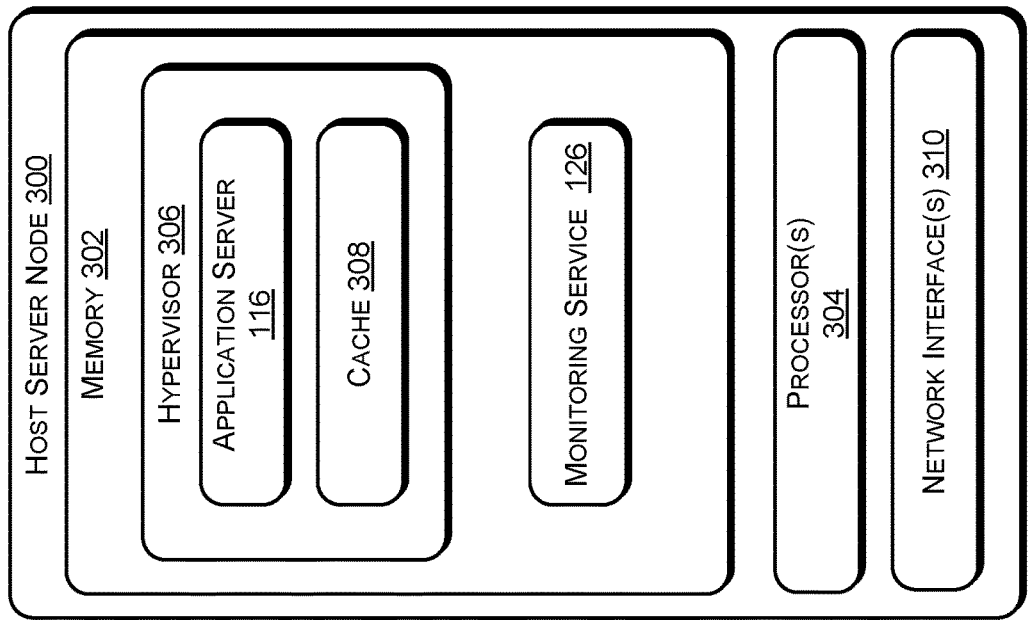
FIG. 3 illustrates a block diagram of an example host server node having a monitoring service.

FIG. 3 illustrates a block diagram of a host server node 300 having a monitoring service 126. The host server node 300 may be the same as or similar to the host server node 114-2 of FIG. 1. The host server node 300 includes a memory 302 and one or more processors 304. The memory 302 is a system memory, such as RAM, as is described in more detail elsewhere within this Detailed Description. The memory 302 includes a hypervisor 306, in which one or more application servers 116 execute as virtualized instantiations. A cache 308, temporarily stores data associated with the application server 116, such as files or other data that may be obtained or generated responsive to client requests.

The monitoring service 126 provides state data associated with the application server 116, as well as the host server node 300 to a server identification service 118. The host server node 300 includes one or more network interfaces 310, which connect the host server node 300 to the network, enabling the host server node 300 to communicate with other devices on the network, such as the monitoring service node 112 and/or the load balancer node 102.

Other examples of host server nodes 300 are possible without departing from the scope of embodiments.

Figure 4:
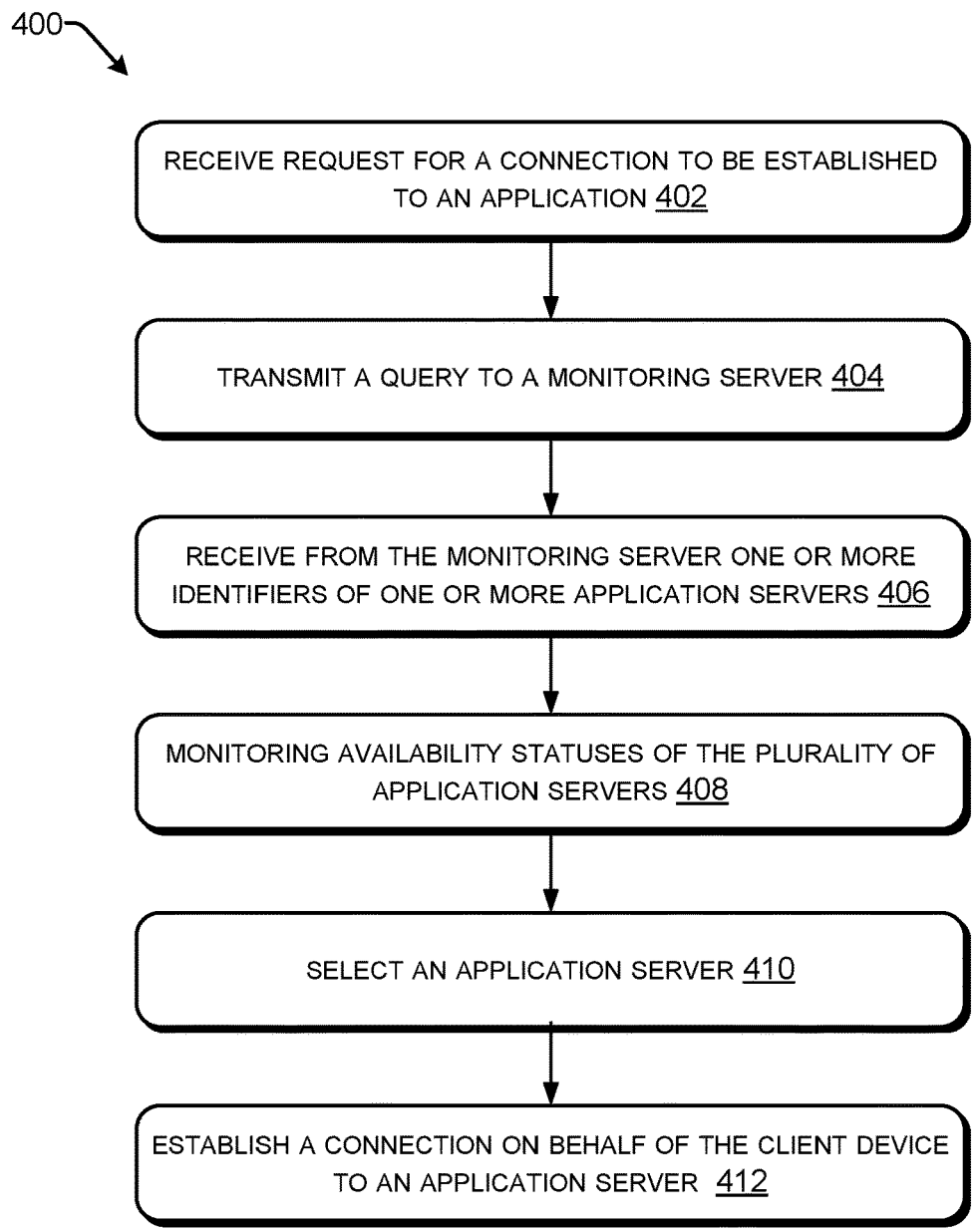
FIG. 4 illustrates a flow chart depicting an example process for providing state-aware load balancing.
Figure 5:
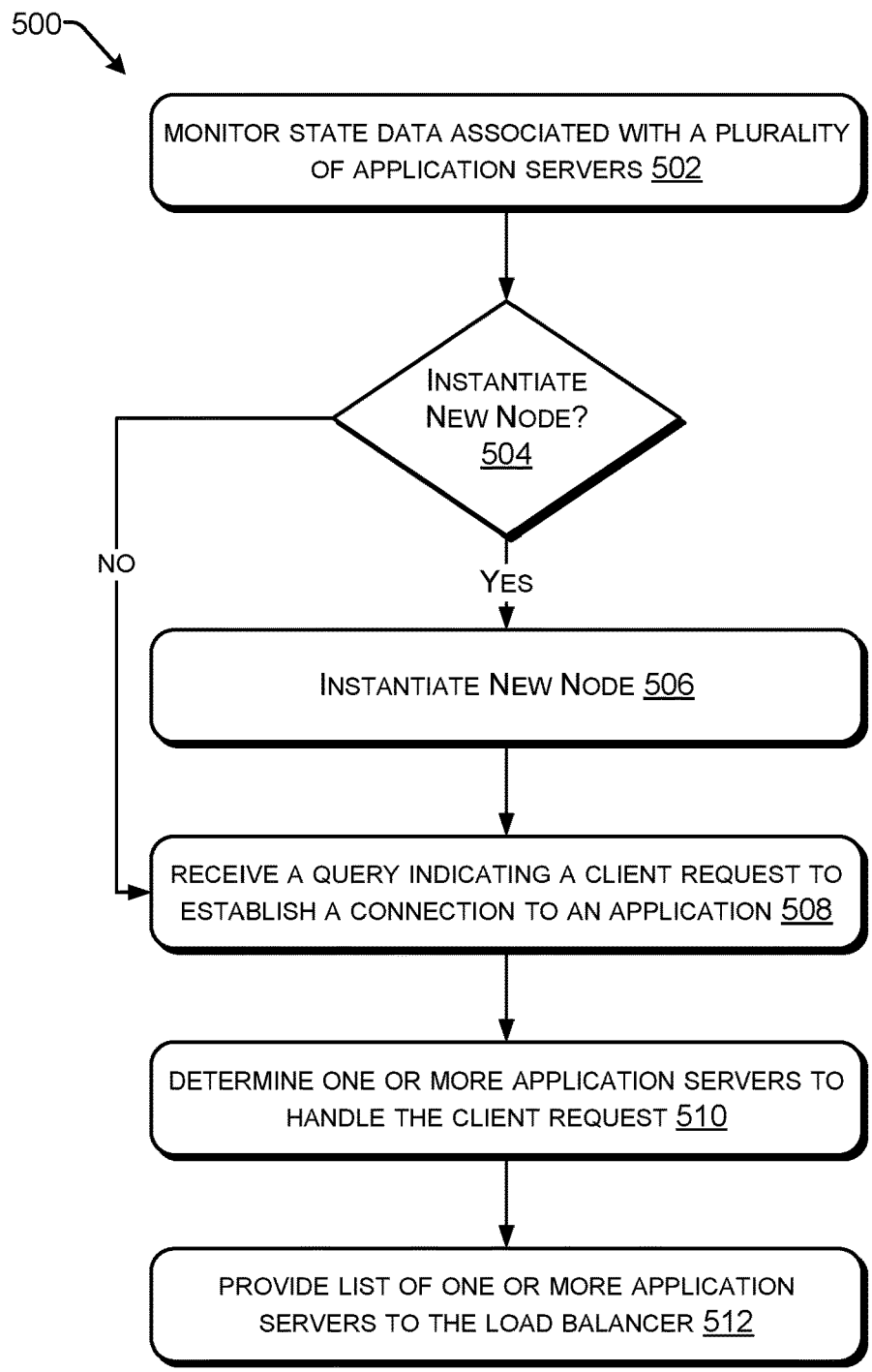
FIG. 5 illustrates a flow chart depicting an example process for determining a list of application servers to handle a client request based on state information.

FIGS. 4 and 5 depict flow diagrams that show example processes in accordance with various examples. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the processes. Processes according to various examples of the present disclosure may include only some or all of the operations depicted in the logical flow graphs.

FIG. 4 illustrates an example process 400 for providing state-aware load balancing. At 402, a load balancer, such as the load balancer node 102, receives from a client device a client request for a connection to be established to an application. The request may identify the application to the load balancer based on one or more of destination network address, protocol, destination port, source port, and so forth. An example would be a destination IP address, designating TCP or UDP as a protocol, and including a UDP or TCP port number, such as TCP port 80, which may identify the request as an HTTP request. Other examples are possible without departing from the scope of embodiments.

At 404, the load balancer transmits a query to a monitoring server for a list of one or more application servers able to service the client request. The query indicates the client request, such as by including data from the request. Example data provided with or in association with the query includes a source or destination network address (e.g., source and destination IP addresses), a protocol of the request (e.g., TCP, UDP, or other protocol), a destination or source port (e.g., TCP or UDP source and destination ports). Other information associated with the request may include higher-layer protocol information included in the client request. For example, where the client request is an HTTP request, the query may identify the specific resource being requested by the client device, such as a specific web page, file, or other resource.

At 406, the load balancer receives from the monitoring server one or more identifiers of one or more application servers of a plurality of application servers associated with the application. As discussed in more detail elsewhere within this Detailed Description, the monitoring server determines the list of one or more application servers based on state information of the plurality of application servers. The list of one or more application servers may include a list of identifiers of the application servers, such as IP addresses, network names, media access control (MAC) addresses, and so forth. A list of priority information such as ranks, weights, or other priority information (such as an HRW hash) may also be provided by the monitoring service node.

At 408, the load balancer monitors availability statuses of the plurality of application servers. The load balancer may monitor network traffic sent to and received from the application servers to detect whether the application servers are accessible or reachable via the network. For example, the load balancer may determine when requests sent to the application servers time-out or otherwise go un-responded to in a timely manner. The load balancer may transmit pings, keep-alives, requests, and other communications in order to maintain a view of the availability of the application servers. The load balancer may include a networking component, such as a virtualized networking component, that maintains visibility into the underlying network infrastructure. For example, the load balancer may include a switch or a router, which receives network routing status updates, and builds one or more routing tables to determine which networks—and therefore which networking end-points—are accessible.

At 410, the load balancer selects the one application server of the one or more application servers. The selection is based on the list of one or more application servers provided by the monitoring service node at 406 and the availability statuses of the plurality of application servers determined by the load balancer at 408. The selection may be made based on one or more policies, such as configurable policies. The selection may be based on priority information provided by the monitoring service node, or based on static or configurable priorities included within a priority store of the load balancer. The selection may be a random selection, a round-robin selection, a weighted random selection (in which the likelihood of an application server being selected is based on a weighting assigned to the application server), or based on some other mechanism.

At 412, the load balancer establishes a connection on behalf of the client device to the selected application server. The establishment of the connection may be a proxy connection, in which the load balancer acts as a proxy server. In such a connection, the proxy server establishes a connection with the client device as if it were the application server, and establishes a connection with the application server as if it were the client.

FIG. 5 illustrates an example process 500 for determining a list of application servers to handle a client request based on state information. At 502, a monitoring service node monitors state data associated with a plurality of application servers. This includes, in some embodiments, receiving one or more updates from the plurality of application servers. The updates may be received as either push or pull updates. A push update is one in which the application servers provide the updates to the monitoring service node without first receiving a request from the service monitoring node. A pull update is one that is provided by the application server responsive to a request. The monitoring service node may also monitor network traffic to determine the state data associated with the application nodes. The monitoring service node may also receive push or pull updates from other elements in the network, such as network elements (e.g., routers, switches, hubs, intelligent racks, etc.), other servers, monitoring agents in the network, and so forth. The state data may include hardware state data, software state data, information regarding the contents of memory or caches of the application servers, and so forth.

At 504, the monitoring service node determines to instantiate a new node based on all host server nodes and/or application servers being above one or more threshold capacity levels. For example, where one or more of CPU load, memory capacity usage, networking load, and so forth, are at or above one or more thresholds, the monitoring service node may determine to cause, at 506, a new application server to be instantiated. The new application server may be instantiated on a different host server node, if the other host server nodes are currently experiencing load at or above the predetermined thresholds. Similarly, the monitoring service node may also shut down an instantiation of an application server based on capacity levels.

At 508, the monitoring service node receives a query from a load balancer. The query indicates a client request received by the load balancer from a client device to establish a connection to an application. The query may include the client request. The query may include data regarding the request, such as source and destination network addresses, protocols, source and destination ports, and higher-layer information such as a specific file, page, or data requested.

At 510, the monitoring service node determines one or more application servers from a plurality of application servers to handle the client request. The determination is based at least on state information of the plurality of application servers as well as the data regarding the request. The determination may be based on one or more algorithms, such as a weighted sum algorithm, or other algorithm type, that accepts state data, and data regarding the client request, and outputs a selection of one or more application servers to handle the client request. The monitoring service node may also determine priority data for the one or more application servers, such as ranks, weights, or other priority data. The priority data may be used to determine the list of one or more application servers. The priority data may also be provided to the load balancer as discussed below. Various aspects of the algorithm used to determine the list of one or more application servers may be set by a policy. Some aspects of the policy may be configurable, as discussed elsewhere within this Detailed Description. One or more of the application servers selected may be newly instantiated ones.

At 512, the monitoring service node provides to the load balancer one or more identifiers corresponding to the one or more application servers. The identifiers may include IP address, MAC addresses, hash values that uniquely identify the application servers, and so forth. The monitoring service node may also provide priority information determined for the one or more application servers, such as ranks or weights (which may be HRW hash values) that the load balancer may use to select from among the list of one or more application servers. One or more of the identifiers may be identifiers of newly instantiated application servers.

Figure 6:
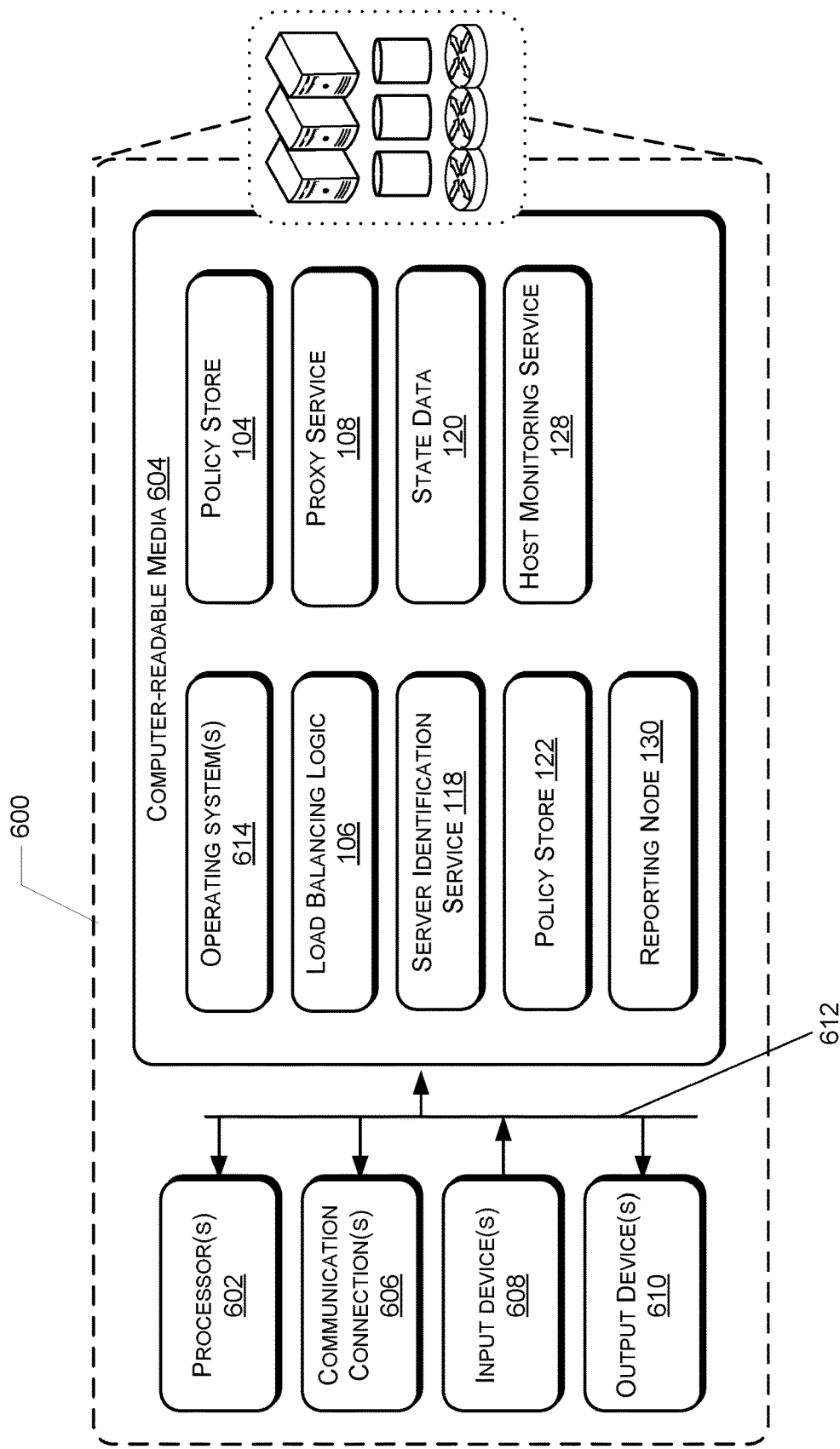
FIG. 6 is a block diagram of an example computing system usable to implement virtual resource monitoring and networking policy updates.

FIG. 6 is a block diagram of an example computing system 600 usable to implement virtual resource monitoring and networking policy updates. Computing system 600 may be deployed in a shared network environment, including in a datacenter, a cloud computing environment, or other network of computing devices. According to various non-limiting examples, the computing system 600 includes one or more devices, such as servers, storage devices, and networking equipment. In one example configuration, the computing system 600 comprises at least one processor 602. The computing system 600 also contains communication connection(s) 606 that allow communications with various other systems. The computing system 600 also includes one or more input devices 608, such as a keyboard, mouse, pen, voice input device, touch input device, etc., and one or more output devices 610, such as a display (including a touch-screen display), speakers, printer, etc. coupled communicatively to the processor(s) 602 and the computer-readable media 604 via connections 612.

Computer-readable media 604 stores computer-executable instructions that are loadable and executable on the processor(s) 602, as well as data generated during execution of, and/or usable in conjunction with, these programs. In the illustrated example, computer-readable media 604 stores operating system instances 614, which provide basic system functionality to the policy store 104, the load balancing logic 106, the proxy service 108, the server identification service 118, the state data 120, the policy store 122, the host monitoring service 128, and the reporting node 130. One or more of these components, including the operating system 614, may be instantiated as virtual machines, application containers, or as some other type of virtualized instantiation.

Processor(s) 602 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing system 600 may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media 604 include volatile memory (such as random access memory (RAM)) and/or non-volatile memory (such as read-only memory (ROM), flash memory, etc.). The computer-readable media 604 can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing system 600.

Computer-readable media 604 can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), static random-access memory (SRAM), dynamic random-access memory (DRAM), other types of random-access memory (RANI), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one computing device or system may cause transmission of a message to another computing device via a network interface. This may include, for example, passing by a software module a pointer, argument, or other data to a networking module. The pointer, argument or other data may identify data stored in memory or in a register that is to be transmitted to another computing device. The networking module may include a protocol stack, and may read the data identified by the pointer, argument, or other data. The protocol stack may encapsulate the data in one or more frames, packets, cells, or other data networking protocol structures. The protocol stack may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver. A processor of the destination computing device passes the device driver an execution thread, which causes a protocol stack module to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module is passed an execution thread along with the argument, pointer, or other data, and reads the data from the identified location.

EXAMPLE CLAUSES

Clause A. A computing system, comprising one or more processors, memory, and a plurality of programming instructions stored on the memory and executable by the one or more processors to perform acts. The acts include receiving information indicating a client request received by a load balancer from a client device, the client request to establish a connection to an application, identifying one or more application servers from a plurality of application servers to handle the client request, based at least on cache state information of the plurality of application servers, and providing to the load balancer one or more identifiers each corresponding to the one or more application servers.

Clause B. The computing system of clause A, wherein the cache state information includes information stored in local memory of the plurality of application servers and application state information of the plurality of applications servers.

Clause C. The computing system of either clause A or B, wherein the cache state information includes availability of data cached on the plurality of application servers, and wherein the identifying the one or more application servers based on the cache state information includes determining whether the data cached on the plurality of application servers are relevant to the client request.

Clause D. The computing system of any of clauses A-C, wherein the acts further include receiving one or more updates from the plurality of application servers and datacenter infrastructure that hosts the plurality of application servers, the one or more updates collectively including the cache state information and capacity information, computing a list of identifiers for a given set of application servers based on the one or more updates, and causing additional application servers to be instantiated based at least on the one or more updates.

Clause E. The computing system of any of clauses A-D, wherein the acts further include identifying the one or more application servers based on capacity information of a datacenter infrastructure that hosts the plurality of application servers on which applications execute, and wherein the capacity information includes a capacity threshold.

Clause F. The computing system of clause E, wherein the capacity information includes one or more of central processing unit (CPU) utilization, memory utilization, storage utilization, network utilization, and wherein the datacenter infrastructure includes one selected from a group consisting of operating systems, software, servers, file servers, network connected storage, and network equipment.

Clause G. The computing system of clause E, wherein the capacity information includes at least one of numbers of currently active connections of the plurality of application servers, numbers of connections per second handled by the plurality of application servers, or online states of the plurality of application servers.

Clause H. The computing system of clause E, wherein the plurality of application servers are virtualized instantiations of application servers executing on one or more host servers, and wherein the capacity information indicates whether the virtualized instantiations are in an active or reachable state.

Clause I. A computing system, comprising one or more processors, memory, and a plurality of programming instructions stored on the memory and executable by the one or more processors to perform load balancing amongst a plurality of application servers. The load balancing including receiving from a client device a request for a connection to be established to an application, transmitting a query to a monitoring server, the query indicating the client request, receiving from the monitoring server, responsive to the query, one or more identifiers of one or more application servers associated with the application being identified based at least on cache state information, and establishing a connection on behalf of the client device to one application server of the one or more application servers.

Clause J. The computing system of clause I, wherein the load balancing further includes monitoring availability statuses of the plurality of application servers, and selecting the one application server of the one or more application servers based at least on the availability statuses of the plurality of application servers.

Clause K. The computing system of clause J, wherein the availability statuses of the plurality of application servers includes availability statuses of at least one host server that hosts at least one of the plurality of application servers.

Clause L. The computing system of any of clauses I-K, wherein the load balancing further includes receiving from the monitoring server data indicating relative rankings of the one or more application servers, and selecting the one application server based at least on the rankings.

Clause M. The computing system of any of clauses I-L, wherein two or more identifiers are received from the monitoring server, and the load balancing further includes one of randomly selecting one identifier of the two or more identifiers, selecting a largest one of the two or more identifiers, wherein the two or more identifiers are generated using Highest Random Weight.

Clause N. A method comprising receiving by a load balancer a request from a client device for a connection to an application, querying a monitoring server for a list of one or more application servers of a plurality of application servers associated with the application, determining by the monitoring server, based on cache state information of the plurality of application servers, the list of one or more application servers, and establishing, by the load balancer, a connection on behalf of the client device to one application server of the one or more application servers.

Clause O. The method of clause N, further comprising providing, by the monitoring server, to the load balancer, the list of the one or more application servers and information indicating a relative priority of the one or more application servers, and determining, by the load balancer, the one application server based at least on the information indicating the relative priority.

Clause P. The method of either of clauses N or O, further comprising determining the list of one or more application servers based at least on determining whether capacity information of the plurality of application servers meets or exceeds one or more utilization thresholds, wherein the capacity information includes hardware state utilization data of one or more host servers on which the application servers are instantiated.

Clause Q. The method of clause P, wherein the plurality of application servers are instantiated as virtual machines on a plurality of host servers, and the capacity information indicates whether each of the virtual machines are currently active and reachable. The method further comprises determining the list of one or more application servers based at least on the capacity information indicating whether each of the virtual machines are currently active and reachable, monitoring, by the load balancer, availability information for the plurality of host servers, and selecting, by the load balancer, the one application server from amongst the one or more application servers based at least on the availability information for the plurality of host servers.

Clause R. The method of clause P, wherein the capacity information is selected from a group consisting of numbers of currently active connections of the plurality of application servers, numbers of connections per second handled by the plurality of application servers, and online states of the plurality of application servers.

Clause S. The method of any of clauses N-R, wherein the cache state information includes information stored in local memory of the plurality of application servers and the method further comprises determining the list of one or more application servers based at least on a relevance of an overlapping cache state of some or all of the information stored in local memory of the plurality of application servers to the client request.

Clause T. The method of any of clauses N-S, further comprising receiving notifications from the plurality of application servers, the notifications indicating the cache state information of the plurality of application servers.

Clause U. A computing system, comprising means for receiving information indicating a client request received by a load balancer from a client device, the client request to establish a connection to an application, means for identifying one or more application servers from a plurality of application servers to handle the client request, based at least on cache state information of the plurality of application servers, and means for providing to the load balancer one or more identifiers each corresponding to the one or more application servers.

Clause V. The computing system of clause U, wherein the cache state information includes information stored in local memory of the plurality of application servers and application state information of the plurality of applications servers.

Clause W. The computing system of either clause U or V, wherein the cache state information includes availability of data cached on the plurality of application servers, and wherein the means for identifying the one or more application servers based on the cache state information includes means for determining whether the data cached on the plurality of application servers are relevant to the client request.

Clause X. The computing system of any of clauses U-W, further comprising means for receiving one or more updates from the plurality of application servers and datacenter infrastructure that hosts the plurality of application servers, the one or more updates collectively including the cache state information and capacity information, means for computing a list of identifiers for a given set of application servers based on the one or more updates, and means for causing additional application servers to be instantiated based at least on the one or more updates.

Clause Y. The computing system of any of clauses U-X, further comprising means for identifying the one or more application servers based on capacity information of a datacenter infrastructure that hosts the plurality of application servers on which applications execute, and wherein the capacity information includes a capacity threshold.

Clause Z. The computing system of clause Y, wherein the capacity information includes one or more of central processing unit (CPU) utilization, memory utilization, storage utilization, network utilization, and wherein the datacenter infrastructure includes one selected from a group consisting of operating systems, software, servers, file servers, network connected storage, and network equipment.

Clause AA. The computing system of clause Y, wherein the capacity information includes at least one of numbers of currently active connections of the plurality of application servers, numbers of connections per second handled by the plurality of application servers, or online states of the plurality of application servers.

Clause AB. The computing system of clause Y, wherein the plurality of application servers are virtualized instantiations of application servers executing on one or more host servers, and wherein the capacity information indicates whether the virtualized instantiations are in an active or reachable state.

Clause AC. A computing system, comprising means for receiving from a client device a request for a connection to be established to an application, means for transmitting a query to a monitoring server, the query indicating the client request, means for receiving from the monitoring server, responsive to the query, one or more identifiers of one or more application servers associated with the application being identified based at least on cache state information, and means for establishing a connection on behalf of the client device to one application server of the one or more application servers.

Clause AD. The computing system of clause AC, further comprising means for monitoring availability statuses of the plurality of application servers, and means for selecting the one application server of the one or more application servers based at least on the availability statuses of the plurality of application servers.

Clause AE. The computing system of clause AD, wherein the availability statuses of the plurality of application servers includes availability statuses of at least one host server that hosts at least one of the plurality of application servers.

Clause AF. The computing system of any of clauses AC-AE, further comprising means for receiving from the monitoring server data indicating relative rankings of the one or more application servers, and means for selecting the one application server based at least on the rankings.

Clause AG. The computing system of any of clauses AC-AF, wherein two or more identifiers are received from the monitoring server, and the computing system further comprises one of means for randomly selecting one identifier of the two or more identifiers, and means for selecting a largest one of the two or more identifiers wherein the two or more identifiers are generated using Highest Random Weight.

Clause AH. A computing system comprising means for receiving by a load balancer a request from a client device for a connection to an application, means for querying a monitoring server for a list of one or more application servers of a plurality of application servers associated with the application, means for determining by the monitoring server, based on cache state information of the plurality of application servers, the list of one or more application servers, and means for establishing, by the load balancer, a connection on behalf of the client device to one application server of the one or more application servers.

Clause AI. The computing system of clause AH, further comprising means for providing, by the monitoring server, to the load balancer, the list of the one or more application servers and information indicating a relative priority of the one or more application servers, and means for determining, by the load balancer, the one application server based at least on the information indicating the relative priority.

Clause AJ. The computing system of either of clauses AH or AI, further comprising means for determining the list of one or more application servers based at least on determining whether capacity information of the plurality of application servers meets or exceeds one or more utilization thresholds, wherein the capacity information includes hardware state utilization data of one or more host servers on which the application servers are instantiated.

Clause AK. The computing system of clause AJ, wherein the plurality of application servers are instantiated as virtual machines on a plurality of host servers, and the capacity information indicates whether each of the virtual machines are currently active and reachable. The computing system further comprises means for determining the list of one or more application servers based at least on the capacity information indicating whether each of the virtual machines are currently active and reachable, means for monitoring, by the load balancer, availability information for the plurality of host servers, and means for selecting, by the load balancer, the one application server from amongst the one or more application servers based at least on the availability information for the plurality of host servers.

Clause AL. The computing system of clause AJ, wherein the capacity information is selected from a group consisting of numbers of currently active connections of the plurality of application servers, numbers of connections per second handled by the plurality of application servers, and online states of the plurality of application servers.

Clause AM. The computing system of any of clauses AH-AL, wherein the cache state information includes information stored in local memory of the plurality of application servers and the computing system further comprises means for determining the list of one or more application servers based at least on a relevance of an overlapping cache state of some or all of the information stored in local memory of the plurality of application servers to the client request.

Clause AN. The computing system of any of clauses AH-AM, further comprising means for receiving notifications from the plurality of application servers, the notifications indicating the cache state information of the plurality of application servers.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computing system, comprising:
   one or more processors;
   memory; and
   a plurality of programming instructions stored on the memory and executable by the one or more processors to perform at least the following:
      receiving by a monitoring server, information indicating a client request received by a load balancer from a client device, the client request comprising a request to establish a connection to an application;
      identifying at least one application server from a plurality of application servers to handle the client request, wherein the identifying is based at least on:
         identifying cache state information of the plurality of application servers;
         determining that data cached on at least one of the plurality of application servers are relevant to the client request; and
      based on the identifying, providing to the load balancer an identifier corresponding to the at least one application server that has been identified as having cache state information and cached data that is relevant to the client request.

2. The computing system of claim 1, wherein the cache state information includes information stored in local memory of the plurality of application servers and application state information of the plurality of applications servers.

3. The computing system of claim 1, wherein determining a relevance of data cached on an application server to the client request comprises determining a likelihood that the data cached on the application server is relevant.

4. The computing system of claim 1, further comprising:
   receiving one or more updates from the plurality of application servers and datacenter infrastructure that hosts the plurality of application servers, the one or more updates collectively including the cache state information and capacity information;
   computing a list of identifiers for a given set of application servers based on the one or more updates; and
   causing additional application servers to be instantiated based at least on the one or more updates.

5. The computing system of claim 1, further comprising identifying the one or more application servers based on capacity information of a datacenter infrastructure that hosts the plurality of application servers on which applications execute, and wherein the capacity information includes a capacity threshold.

6. The computing system of claim 5, wherein the capacity information includes one or more of central processing unit (CPU) utilization, memory utilization, storage utilization, network utilization, and wherein the datacenter infrastructure includes one selected from a group consisting of operating systems, software, servers, file servers, network connected storage, and network equipment.

7. The computing system of claim 5, wherein the capacity information includes at least one of numbers of currently active connections of the plurality of application servers, numbers of connections per second handled by the plurality of application servers, or online states of the plurality of application servers.

8. The computing system of claim 5, wherein the plurality of application servers are virtualized instantiations of application servers executing on one or more host servers, and wherein the capacity information indicates whether the virtualized instantiations are in an active or reachable state.

9. A computing system, comprising:
   one or more processors;
   memory; and
   a plurality of programming instructions stored on the memory and executable by the one or more processors to perform load balancing amongst a plurality of application servers, the load balancing including:
      receiving from a client device a client request for a connection to be established to an application;
      transmitting a query to a monitoring server, the query indicating the client request;
      receiving from the monitoring server, responsive to the query, one or more identifiers of one or more application servers to handle the client request, the one or more application servers being identified based at least on
         cache state information for the one or more application servers; and
         a determination that each of the one or more application servers contains data cached on the respective application server that is relevant to the client request; and
      establishing a connection on behalf of the client device to at least one application server of the one or more application servers that has been identified as having cache state information and data cached on the at least one application server that is relevant to the client request.

10. The computing system of claim 9, wherein the load balancing further includes:
    monitoring availability statuses of the plurality of application servers; and
    selecting the one application server of the one or more application servers based at least on the availability statuses of the plurality of application servers.

11. The computing system of claim 10, wherein the availability statuses of the plurality of application servers includes availability statuses of at least one host server that hosts at least one of the plurality of application servers.

12. The computing system of claim 9, wherein the load balancing further includes:

receiving from the monitoring server data indicating relative rankings of the one or more application servers; and selecting the one application server based at least on the relative rankings.

13. The computing system of claim 9, wherein the one or more application servers includes at least a first application server and a second application server, and wherein the load balancing further includes:

receiving a first hash value associated with the first application server and a second hash value associated with the second application server; and selecting the one application server as either the first application server or the second application server, based on a largest one of the first hash value and the second hash value.

14. A method comprising:

receiving by a load balancer a client request from a client device for a connection to an application;

querying a monitoring server for a list of one or more application servers of a plurality of application servers to handle the client request;

determining by the monitoring server the list of one or more application servers, wherein the determining of the one or more application servers is based at least on:
cache state information of the plurality of application servers; and
determining whether data cached on the plurality of application servers are relevant to the client request; and establishing, by the load balancer, a connection on behalf of the client device to an application server of the one or more application servers that has been identified as having cache state information and data cached on the application server that is relevant to the client request.

15. The method of claim 14, further comprising:

providing, by the monitoring server, to the load balancer, the list of the one or more application servers and information indicating a relative priority of the one or more application servers; and determining, by the load balancer, the one application server based at least on the information indicating the relative priority.

16. The method of claim 14, further comprising determining the list of one or more application servers based at least on determining whether capacity information of the plurality of application servers meets or exceeds one or more utilization thresholds, wherein the capacity information includes hardware state utilization data of one or more host servers on which the application servers are instantiated.

17. The method of claim 16, wherein the plurality of application servers are instantiated as virtual machines on a plurality of host servers, and the capacity information indicates whether each of the virtual machines are currently active and reachable, the method further comprising:

determining the list of one or more application servers based at least on the capacity information indicating whether each of the virtual machines are currently active and reachable;

monitoring, by the load balancer, availability information for the plurality of host servers; and selecting, by the load balancer, the one application server from amongst the one or more application servers based at least on the availability information for the plurality of host servers.

18. The method of claim 16, wherein the capacity information is selected from a group consisting of numbers of currently active connections of the plurality of application servers, numbers of connections per second handled by the plurality of application servers, and online states of the plurality of application servers.

19. The method of claim 14, wherein the cache state information includes information stored in local memory of the plurality of application servers and the method further comprises determining the list of one or more application servers based at least on a relevance of an overlapping cache state of some or all of the information stored in local memory of the plurality of application servers to the request.

20. The method of claim 14, further comprising receiving notifications from the plurality of application servers, the notifications indicating the cache state information of the plurality of application servers.

* * * * *